United States Patent
Kane

(10) Patent No.: US 9,911,981 B1
(45) Date of Patent: Mar. 6, 2018

(54) CATALYZED, HIGH ENERGY DENSITY, METAL-AIR BATTERY

(71) Applicant: Sandia Corporation, Albuquerque, NM (US)

(72) Inventor: Marie C. Kane, Danville, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 244 days.

(21) Appl. No.: 14/683,490

(22) Filed: Apr. 10, 2015

Related U.S. Application Data

(60) Provisional application No. 61/977,750, filed on Apr. 10, 2014.

(51) Int. Cl.

| | |
|---|---|
| H01M 4/86 | (2006.01) |
| H01M 4/88 | (2006.01) |
| H01M 12/00 | (2006.01) |
| H01M 12/02 | (2006.01) |
| H01M 4/90 | (2006.01) |

(Continued)

(52) U.S. Cl.
CPC ......... *H01M 4/8605* (2013.01); *H01M 4/382* (2013.01); *H01M 4/8663* (2013.01); *H01M 4/8817* (2013.01); *H01M 4/8846* (2013.01); *H01M 4/9041* (2013.01); *H01M 4/9075* (2013.01); *H01M 12/00* (2013.01); *H01M 12/02* (2013.01); *H01M 2004/027* (2013.01); *H01M 2004/8689* (2013.01)

(58) Field of Classification Search
None
See application file for complete search history.

(56) References Cited

U.S. PATENT DOCUMENTS

| | | | |
|---|---|---|---|
| 6,641,948 B1 * | 11/2003 | Ohlsen | H01M 4/8605 429/480 |
| 2009/0303660 A1 * | 12/2009 | Nair | H01G 11/46 361/502 |

(Continued)

FOREIGN PATENT DOCUMENTS

| | | | | |
|---|---|---|---|---|
| KR | 10-2007-0052357 | * | 12/2007 | C01B 33/14 |
| WO | WO 2011/161595 | * | 12/2011 | H01M 12/06 |

OTHER PUBLICATIONS

Hubert et al., "Carbon-silica sol-gel derived nanomaterials," Materials Science—Poland, vol. 23, No. 1, 2005, pp. 61-68 (month unknown).*

(Continued)

*Primary Examiner* — Ula C Ruddock
*Assistant Examiner* — Amanda Barrow
(74) *Attorney, Agent, or Firm* — Medley, Behrens & Lewis, LLC

(57) ABSTRACT

An air-cathode battery includes a porous cathode current collector with an air interface, an ionic liquid electrolyte disposed in pores of the porous cathode current collector; a metal anode, and a separator in contact with the ionic liquid electrolyte and coupled between the porous cathode current collector and the metal anode. The porous cathode current collector is an ionogel formed from a silica sol-gel or a carbonized resorcinol-formaldehyde aerogel and the pores are functionalized with a thiol group-containing species that is functionalized with one or more catalytic nanoparticles or the pores are electroplated with catalytic metal.

19 Claims, 2 Drawing Sheets

(51) Int. Cl.
　　　*H01M 4/38*　　　(2006.01)
　　　*H01M 4/02*　　　(2006.01)

(56)　　　　References Cited

U.S. PATENT DOCUMENTS

| | | | | |
|---|---|---|---|---|
| 2009/0305026 | A1* | 12/2009 | Wang | H01G 11/46 428/312.6 |
| 2011/0136024 | A1* | 6/2011 | Seymour | H01M 4/8605 429/405 |
| 2012/0021279 | A1* | 1/2012 | Le Bideau | H01M 2/1646 429/189 |
| 2012/0115047 | A1* | 5/2012 | Ma | H01M 4/8668 429/405 |
| 2013/0280624 | A1* | 10/2013 | Lohmann | H01M 4/8626 429/405 |
| 2014/0017577 | A1* | 1/2014 | Minami | H01M 4/9016 429/405 |

OTHER PUBLICATIONS

Yim et al, "Synthesis and Properties of Pyrrolidinium and Perperidinium Bis)trifluoromethanesulfonyl)imide Ionic Liquids with Allyl Substituents," Bull, Korean. Chem. Soc. 2007, vol. 28, No. 9, pp. 1567-1572 (month unknown).*

Néouze et al., Ionogels, New Materials Arising from the Confinement of Ionic Liquids within Silica- Derived Networks, Chem. Mater. 2006, 18, 3931-3936 (month unknown).*

Katoh et al., Ceramic Materials for Energy Applications: Ceramic Engineering and Science Proceedings, vol. 32, Issue 9, Nov. 11, 2011, pp. 24-28 (month unknown).*

Zanella, et al., "Deposition of Gold Nanoparticles onto Thiol-Functionalized Multiwalled Carbon Nanotubes", In The Journal of Physical Chemistry B, vol. 109, No. 34, 2005, pp. 16290-16295.

Warren, et al., "A Silica Sol-Gel Design Strategy for Nanostructured Metallic Materials", In Nature Materials, vol. 11, May 2012, pp. 460-467.

Agrawal, et al., "Porous Carbon Materials for Li-S Batteries Based on Resorcinol-Formaldehyde Resin with Inverse Opal Structure", In The Journal of Power Sources, vol. 261, 2014, pp. 363-370.

Olivares-Marin, et al., "Effects of a Architecture on the Electrochemistry of Binder-Free Inverse Opal Carbons as Li-Air Cathodes in an Ionic Liquid-Based Electrolyte", In The Journal of Materials Chemistry A, 2013, vol. 1, pp. 14270-14279.

Horikawa, et al., "Controllability of Pore Characteristics of Resorcinol-Formaldehyde Carbon Aerogel." Carbon 42.8 (2004): 1625-1633.

Zhang, et al., "Physical properties of ionic liquids: database and evaluation." Journal of Physical and Chemical Reference Data, vol. 35.4 (2006): 1475-1517.

Lu, et al., "Platinum-gold Nanoparticles: A Highly Active Bifunctional Electrocatalyst for Rechargeable Lithium-air Batteries." Journal of the American Chemical Society 132.35 (2010): 12170-12171.

Kang, et al., "Highly Selective Adsorption of Pt2+ and Pd2+ Using Thiol-functionalized Mesoporous Silica." Ind. & Eng. Chem. Res. 43.6 (2004): 1478-1484.

J.-B. Ducros et al., "Ionic and electronic conductivities in carbon nanotubes-ionogel solid device." Journal of Materials Chemistry 21.8 (2011): 2508-2511.

Kuboki, et al., "Lithium-air batteries using hydrophobic room temperature ionic liquid electrolyte." Journal of Power Sources 146.1 (2005): 766-769.

Mirzaeian, et al., "Preparation of controlled porosity carbon aerogels for energy storage in rechargeable lithium oxygen batteries." Electrochimica Acta 54.28 (2009): 7444-7451.

Li, "Metal-Air Batteries: Will They Be the Future Electrochemical Energy Storage Device of Choice?", ACS Energy Letters 2017; 2(6): 1370-1377.

* cited by examiner

CATALYZED, HIGH ENERGY DENSITY, METAL-AIR BATTERY

CROSS-REFERENCE TO RELATED APPLICATION

This application claims priority to U.S. Provisional 61/977,750, filed on Apr. 10, 2014, which is hereby incorporated by reference in its entirety.

STATEMENT OF GOVERNMENTAL INTEREST

This invention was developed under Contract DE AC04-94AL85000 between Sandia Corporation and the U.S. Department of Energy. The U.S. Government has certain rights in this invention.

FIELD

This disclosure relates to air cathode batteries.

BACKGROUND

Most batteries are intrinsically low capacity systems despite their use of low molecular weight (e.g. lithium or zinc anode) materials. The utilization of an air cathode, where the cathode active material is stored outside the battery is one way in which to enhance the overall battery capacity. Air cathode batteries could drastically impact applications that demand a rugged, safety-focused, low weight, small volume, high energy-density power source. However, several technical challenges hinder such batteries. The first challenge lies in the cathode current collector, which brings oxygen into the cell using ambient air and serves as the substrate for the metal-oxygen reaction. Typically, the cathode consists of a porous carbon layer which may contain catalyst particles. Current research has not yet determined the optimal pore size for the cathode current collector or the specific mechanism responsible for enhancing the lithium-oxygen reaction by catalysts. The second challenge lies in the choice of electrolyte. Most lithium-air batteries utilize an organic electrolyte because of its fast lithium ion conduction; however, this approach results in "clogging" of the cathode current collector pores and reduced battery energy density due to insolvency of the lithium peroxide. Additionally, organics react with oxygen and the metal anode over time, causing unwanted side reactions.

SUMMARY

Most current research addresses the cathode current collector or electrolyte challenges separately, but a synergistically improved solution lies in addressing the interactions between these components and designing a system that solves both challenges.

An air-cathode battery includes a porous cathode current collector with an air interface, an ionic liquid electrolyte disposed in pores of the porous cathode current collector; a metal anode, and a separator in contact with the ionic liquid electrolyte and coupled between the porous cathode current collector and the metal anode. The porous cathode current collector is an ionogel formed from a silica sol-gel or a carbonized resorcinol-formaldehyde aerogel and the pores are functionalized with a thiol group-containing species that is functionalized with one or more catalytic nanoparticles or the pores are electroplated with catalytic metal.

A method of making a porous cathode current collector for an air cathode battery includes synthesizing a silica sol-gel or a carbonized resorcinol-formaldehyde aerogel porous material; optionally drying the silica sol-gel to form a silica aerogel; adding an ionic liquid electrolyte; optionally adding carbon nanoparticles or a pre-formed carbon mat to make the porous material conductive; and functionalizing pores of the porous material with a thiol group containing species, then functionalizing the thiol group containing species with catalytic nanoparticles, or electroplating the pores with a catalytic metal.

In an embodiment, a porous cathode current collector includes an ionic liquid electrolyte disposed in pores of the porous cathode current collector, wherein the porous cathode current collector is an ionogel formed from a silica sol-gel, or a carbonized resorcinol-formaldehyde aerogel and the pores are functionalized with a thiol group-containing species that is functionalized with one or more gold nanoparticles or the pores are electroplated with gold.

DETAILED DESCRIPTION

The present disclosure provides embodiments that seek to overcome current lithium-air battery limitations by developing a novel non-clogging, inherently safe, and mechanically robust functionalized cathode current collector for a metal-air battery in combination with an air-stable, non-toxic electrolyte. In an embodiment, by choosing an appropriate ionic liquid electrolyte and combining it with a porous cathode current collector that is functionalized with a catalyst, a high performance air-cathode battery can be formed with surprising and synergistic results. For example, the practical energy density of one type of battery currently in use ($Li/MnO_2$) is approximately 280 Wh/kg, whereas the practical energy density for Li-air batteries is 1800 Wh/kg. In contrast, an embodiment of a battery disclosed herein may have an energy density twice that of a $Li/MnO_2$ battery or 560 Wh/kg and at less than half its volume.

The metal air-cathode battery described herein, may be applied to both primary and secondary metal air-cathode batteries. Such batteries may find particular application in electric devices such as electric vehicles, portable electronics, and military applications.

Figure 1:
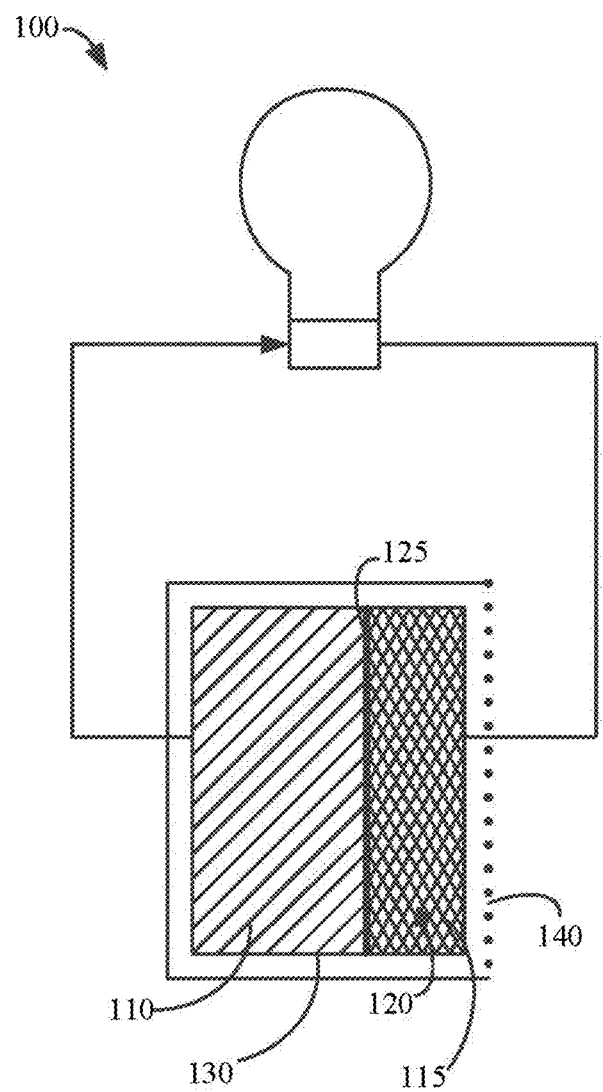
FIG. 1 is a schematic of an embodiment of an air-cathode battery.

FIG. 1 shows a schematic of an embodiment of an air-cathode battery 100, which includes a metallic anode 110, a cathode current collector 115 that is soaked in an electrolyte 120, and a separator 125. These components are all contained within a housing 130. Electrical current in the form of charged species, such as $OH^-$ ions, flows from the electrolyte 120 to the anode 110. The separator 125 is coupled between (in this case in direct contact with) the cathode current collector 115 and the anode 110, and is in contact with and wets the electrolyte 120. The separator 125 is in the path of electron flow to the anode 110 from the cathode current collector 115.

Unlike a traditional battery cathode, the cathode current collector 115 does not contain a reservoir of active material for the cathode. Instead, the cathode current collector 115 is coupled to an air interface 140 that exposes the cathode current collector 115 to ambient air, but still contains the battery components within the housing 130. In an embodiment, the air interface 140 may be a porous membrane. Because the active cathode material is stored outside the housing, the cathode current collector 115 is not referred to, herein, as the cathode per se. The cathode current collector 115 should be conductive and capable of transporting charge.

In an embodiment, the cathode current collector comprises a porous nanostructured or microstructured material that has pores that are controllable in size (diameter) and dispersity. This stands in contrast to the commonly used porous current collectors with ill-defined pore size/morphology, such as nickel foams or carbon-based diffusion layers such as those used in fuel cell applications. The porous material should also be conductive.

Using the porous material as a scaffold for the cathode current collector allows precision tailoring of the pore size to prevent clogging by metal-oxygen reaction products. The pore size is controlled via synthesis chemistry and reaction conditions. The pore sizes may be monodisperse, or within a size distribution that forms a hierarchy of sizes within the cathode current collector. In an embodiment, a silica solgel (or aerogel if supercritically dried) composite may be used as the porous material and may be embedded with carbon or metallic nanoparticles to provide conductivity and current collection. In another embodiment a resorcinol-formaldehyde aerogel matrix may be used as the cathode current collector. In an embodiment, the resorcinol-formaldehyde aerogel may be carbonized at high temperature to form the carbonized aerogel.

Figure 2:
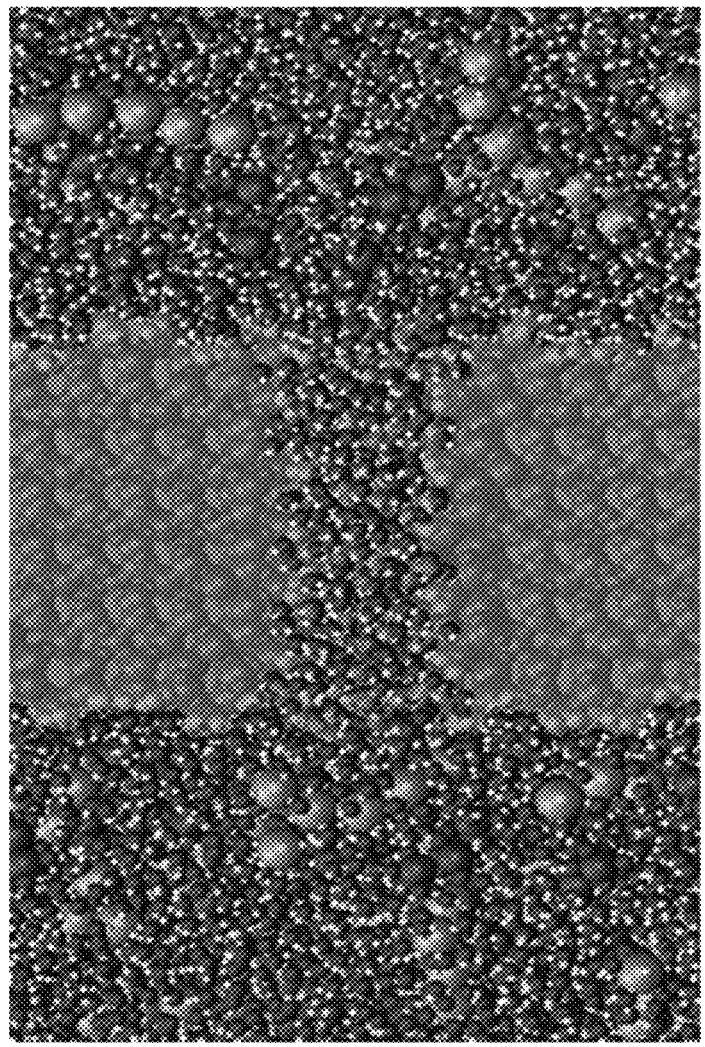
FIG. 2 is a computer simulated graphic of ionic flow through a single pore.

To select beneficial pore sizes for the current collector material, computerized molecular simulations can be used to investigate metal oxide and peroxide (such as $LiO_2$ and $Li_2O_2$) as well as oxygen ($O_2$) diffusion through the pores to determine which transport mechanisms exist and how to most effectively leverage them. Pore impedance can also be quantified by examining ion entrainment. Network models can synthesize these results to estimate effective transport properties. See FIG. 2 showing a simulation of ionic flow through a single pore.

The average pore size of the porous current collector in terms of diameter, measured from one side of the pore to another, may range from 10 nm to 10 μm, such as, for example, 25 nm to 200 nm, or 50 nm to 5 μm. This average may be calculated as a number average deduced from measurements on a microscopic image. The pore polydispersity in terms of pore diameters, may range from, for example, 1 to 1.5, 1.01 to 1.1, or 1.0 to 1.3. This may also be calculated as a number average deduced from measurements on a microscopic image.

In an embodiment, the cathode current collector includes conductive particles that are embedded within the structure of the cathode current collector. These particles may be selected, for example, from carbon black, carbon nanoparticles, gold, platinum, or nanotubes. If carbon black is used, acetylene black, channel black, furnace black, and lamp black subtypes may be selected. Furthermore, ASTM grades in the N100, N200, N300, N400, N500, N600 series may be selected. The amount of conductive nanomaterials added to the cathode current collector will be sufficient to meet the percolation threshold, at which a complete electrical network is formed throughout the cathode current collector to carry electrons out of the battery.

In an embodiment, the pores of the current collector are functionalized to catalytically enhance the reaction between the metal ions and the oxygen. By functionalizing the pore walls with linking agents (e.g., silane coupling agents) that have affinity to particles of interest, catalyst particles can be attached to the pores of the cathode current collector via covalent bonding to aid in the Li—O reaction.

In an embodiment, the pores are functionalized with gold, platinum or other metal catalysts in order to substantially increase overall battery efficiency. Though the mechanism is not fully understood, it is believed that the catalytic nanoparticles facilitate the decomposition of metal peroxide, such as lithium peroxide, during discharge, thereby improving battery efficiency. In certain embodiments, other nanoparticles can be used that facilitate the metal-oxygen reaction.

The catalyst nanoparticles may, for example, have an average particle diameter of 5 nm to 150 nm, such as, for example 15 nm to 115 nm, or 30 nm to 90 nm. The particle diameter should be small enough so that it does not restrict the flow of electrolyte within the pores or hinder the movement of side reaction products away (for example, lithium peroxide) from active reaction sites within the pores.

The catalyst nanoparticles are present in the pores of the cathode current collector in a catalytic amount. Computer-based modeling may be used to guide the selection of pore size and catalyst particle density. For information describing the modeling process see, T. Kang, Y. Park, and J. Yi., *Highly Selective Adsorption of Pt2+ and Pd2+ Using Thiol-Functionalized Mesoporous Silica*, Ind. Eng. Chem. Res. 43, 1478 (2004) and J. W. Lee, R. H. Nilson, J. A. Templeton, S. K. Griffiths, A. Kung, B. M. Wong, *Comparison of Molecular Dynamics with Classical Density Functional and Poisson-Boltzmann theories of the Electric Double Layer in Nanochannels*, J. Chem. Theor. Comp., 2012 Jun. 12; 8(6): 2012-2022. In an embodiment, the weight content of the gold nanoparticles may be, for example, 0.01% to 10% by weight of the current cathode collector, such as, 0.1% to 2%, or 0.3% to 0.9%. The density of the gold nanoparticles in the cathode current collector is a function of the density of active sites created by the coupling agent and would vary based on which coupling agent is used.

In an embodiment, the catalyst nanoparticles are adhered to the walls of the silica sol-gel by first grafting a species containing a thiol functional group to the walls of the pores. For example, the thiol containing group may be selected from a mercapto-silane. More specific examples of these include, 3-(mercaptopropyl)trimethoxysilane (MPTMS), or 3-mercaptopropylmethyldimethoxysilane.

In another embodiment, gold or another catalytic metal may be applied in a catalytic amount to the pores by electroplating the cathode current collector with gold or another catalytic metal. In an embodiment, a layer of electroplated metal, such as gold is 1 nm to 25 nm, such as 1 nm to 3 nm, or 5 nm to 20 nm in thickness.

The anode is not necessarily lithium, but more generally may comprise a material that is subject to oxidation. Examples include calcium, aluminum, sodium, iron, cadmium, zinc, magnesium, and alloys of metals, such as those listed above with other metals.

In an embodiment, the electrolyte is a room temperature ionic liquid. The ionic liquid may be from any number of ionic liquid families, such as imidazoliums, pyrrolidiniums, piperidiniums or pyridiniums, for example.

In an embodiment, the use of a highly stable ionic liquid for the electrolyte provides low volatility, high ionic conductivity, high thermal stability and a wide electrochemical window. Computer aided modeling may be used to determine the ionic liquids with the most promising electrochemical properties for a given application, depending, for example, on the metal anode and porous material current collector material. In an embodiment, the ionic liquids will be selected to be hygroscopic, have a low viscosity, and high ionic conductivity for the metal ion. Reference can be made to published works on the properties of certain ionic liquids to determine suitable candidates for the electrolyte of embodiments of air cathode batteries described herein. See T. Kuboki, T. Okuyama, T. Ohsaki, N. Takami, *Lithium-air batteries using hydrophobic room temperature ionic liquid electrolyte*, J. Power Sources. 146, 766, 2005; R. Kanzaki, T. Mitsugi, S. Fukuda, K. Fujii, M. Takeuchi, Y. Soejima, T. Takamuku, T. Yamaguchi, Y. Umebayashi, S. Ishiguro, *Ion-ion interaction in room temperature ionic liquid 1-ethyl-3-methylimidazolium tetrafluoroborate studied by large angle X-ray scattering experiment and molecular dynamics simulations*, J. Mol. Liqu. 147, 77, 2009; and *Transport Coefficients, Raman Spectroscopy, and Computer Simulation of Lithium Salt Solutions in an Ionic Liquid*, M. J. Monteiro, F. F. O Bazito, L. J. A. Siqueira, M. C. C. Ribeiro, R. M. Torresi, J. Phys. Chem. B 112, 2102, 2008.

In an embodiment, the ionic liquid may be selected from the imidazolium family and used as a battery electrolyte with various Li-based salts. An example imidazolium is 1-ethyl-3-methylimidazolium mixed with salts such as $LiPF_6$, $LiBF_4$, $LiClO_4$, $Li(CF_3SO_3)$, $Li[N(CF_3SO_2)_2]$ or $Li[N(C_2F_5SO_2)_2]$ in concentrations ranging from 0.075M to 1M in the ionic liquid.

By ionic liquid it is meant a salt that has a melting point of 100° C. or less, such as, for example, a melting point of −100° C. to 30° C., or 0° C. to 25° C. In an embodiment, the ionic liquid is thermally stable (to decomposition) up to 350° C., such as thermally stable up to 300° C., or from 100° C. to 325° C., which indicates low flammability and low volatility. In an embodiment, the ionic liquid may have a viscosity that is optimized to be as low as possible to promote ionic conductivity. The viscosity can range from 10 to 200 cP, such as, for example 20 cP to 100 cP, or 45 cP to 75 cP. In an embodiment, the electrolyte has a conductivity of, for example, 100 to 1000 mS/cm, such as about 150 to 300 mS/cm or 400 to 700 mS/cm. In an embodiment, the pH of the electrolyte, may range from 3 to 10 for example, 7 to 9, or 7.5 to 8.5.

The separator should be a porous membrane that allows charge carriers (in this case, metal ions) within the electrolyte to pass, but prevents short circuits between the anode and cathode current collector. Ideally, the separator would also prevent the crossover of water or other contaminant species to the anode side. The separator may be selected from those commonly used in metal air batteries, such as, any of a variety of microporous polymeric, glass or nonwoven fiber membranes that are chemically and electrically stable in the selected electrolyte. The separator may have a thickness, for example, of 0.1 mils to 10 mils, such as 0.5 mils to 5 mils, or 0.75 mils to 2 mils.

A suitable ionic liquid electrolyte and cathode current collector system can be formed along with an anode and separator into a housing, such as, for example, a coin cell configuration.

In an embodiment, the air-cathode battery will have a gravimetric capacity of 1000 to 3840 mAh g−1, such as 1500 to 2200 mAh g−1, or 2400 to 3000 mAh g−1. In an embodiment, the air-cathode battery described herein will have an open circuit voltage (vs. Li/Li+) of 2.7 to 3.1 V, such as 2.8 to 3.0 V, or 2.9 to 3.1 V.

In an embodiment, the air cathode battery may include an oxygen gas source, that may be a pure oxygen gas source. For example, the battery may be supplied continuously with oxygen for the cathode. In another example, the exposure of the cathode current collector may be alternated between ambient air and the oxygen source by valve. This embodiment, may be preferable if the battery is intended to operate in very humid conditions and a sufficiently hygroscopic ionic liquid and lithium salt cannot be determined so that the battery functions well in high humidity (e.g., there is water crossover to the anode). A humidity sensor may be used to trigger an automatic switch over to the oxygen source at a certain high level of humidity, e.g. 70%, 80% or 90% humidity.

In an embodiment, the silica sol-gel (or aerogel when supercritically dried) is synthesized through procedures, such as, for example, the procedures found in Michele L. Anderson, Catherine A. Morris, Rhonda M. Stroud, Celia I. Merzbacher, & Debra R. Rolison, *Colloidal Gold Aerogels: Preparation, Properties, and Characterization*, Langmuir 1999, 15, 674-681. The procedure described in that publication may be adapted for making the silica sol-gel or aerogel by substituting carbon nanoparticles for the gold colloids disclosed in the article.

The conductive nanoparticles may be added in situ during the formation of the sol-gel. The particles are incorporated into the gel structure during gelation and cannot be removed upon subsequent washing of the sol-gel and supercritical drying.

As an alternative, in some embodiments a pre-formed carbon network, such as a mat, can be used to form the electrically conducting layer instead of inserting the particles in-situ.

In an embodiment, the resorcinol formaldehyde porous material is synthesized through procedures, such as are disclosed in, for example, Toshihide Horikawa, et al, *Controllability of Pore Characteristics of Resorcinol-Formaldehyde Carbon Aerogel*, Carbon, 42, 1625-1633 (2004). The ratios of constituents used in this reaction can be changed so as to affect the pore size of the resulting aerogel. The carbonization temperature was in the range of 775-1180K.

In an embodiment, unlike more traditional synthesis procedures, the selected electrolyte (ionic liquid) will be used as the reaction solvent so that the pores will remain infused with the ionic liquid electrolyte solution. In this embodiment, the ionic liquid electrolyte may be added prior to or during synthesizing of the silica sol-gel and the ionic liquid electrolyte acts as a solvent for the synthesis reaction.

In another embodiment, a different solvent is used for the synthesis of the porous cathode current collector material, and the ionic liquid electrolyte is added into the pores after synthesizing of the silica aerogel or resorcinol-formaldehyde aerogel. A drying process, such as supercritical drying, can remove the solvent used during synthesis. The ionic liquid is then taken up into the pores of the cathode current collector by capillary forces.

The pores of the porous cathode current collector are functionalized with catalysts in order to greatly increase cell efficiency by enhancing the kinetics of the oxygen reduction reaction (ORR) and oxygen evolution reaction (OER). In an embodiment, gold nanoparticles are adhered to the walls of the pores of the cathode current collector by first grafting a species containing a thiol functional group to the pore walls via silane coupling. The silane group will attach to the hydroxyl groups on the surface of the inorganic pore wall by a condensation reaction. The silane coupling agent has an alkyl group with a pendant mercapto group used for binding to the catalyst.

After functionalization with the thiol containing group, the aerogel may then be infused with a solution of catalytic (e.g., gold) nanoparticles, which have an affinity to bonding to the thiol containing groups. The aerogel may, for example, be placed into the nanoparticle/solvent solution and the solution will infuse into the pores via capillary forces.

In an embodiment of this procedure, the functionalization is performed in the ionic liquid electrolyte, wherein the ionic liquid electrolyte functions as the solvent for the reaction. This can only be done if the silane coupling agent is miscible with the desired ionic liquid electrolyte. Additionally, the sol-gel or aerogel infused with the ionic liquid (ionogel) must be heated (for example to temperatures exceeding 100° C., such as 110° C. to 200° C.) before use in a battery to sufficiently remove any water generated during the condensation reaction.

In another embodiment, a solvent is selected particularly for the thiol group functionalization, such as, e.g., ethanol or methanol with trace amounts of water (sufficient water for hydroxyl group formation on the surface of the pores). After the functionalization is complete, the solvent is exchanged for the ionic liquid electrolyte or the solvent can be removed via drying and replaced with the ionic liquid electrolyte.

In other cases where the ionic liquid electrolyte is exchanged after synthesis of the sol-gel or carbonized resorcinol-formaldehyde aerogel, the ionic liquid electrolyte can be added after synthesizing of the silica sol-gel, after drying the sol-gel (adding it to the aerogel form), to the carbonized resorcinol-formaldehyde aerogel, or after the addition of the catalytic nanoparticles in either the silica sol-gel, aerogel, or carbonized resorcinol-formaldehyde aerogels. In another embodiment, a solvent exchange may be performed after the gold nanoparticles are placed into the pores. After the ionic liquid is added to the porous material, it is an ionogel material.

In another alternative, the addition of catalysts to the pores may be achieved by electroplating the pores with a monolayer of gold or other catalytic metal. For example, the electrodeposition of 1 nm thick gold may be carried out at 120° F. under a cathodic current density of 0.5 mAcm$^{-2}$ for 3.6 s deposition time in an aqueous gold cyanide solution using a three-electrode setup, including a platinized titanium mesh counter electrode, Ag/AgCl reference electrode, and the conductive porous substrate working electrode. The ionic liquid electrolyte may then be added after the electroplating is complete and the aqueous solution removed via drying.

In an embodiment, the cathode current collector is exclusive of a gold metal framework. The silica aerogel or carbonized resorcinol-formaldehyde aerogel framework has superior shock resistance and vibration resistance properties to a nanoporous gold framework. In addition, the gold metal is only used in a catalytic amount. For example, the catalytic amount may be less than 5 wt % of the current collector cathode, such as 0.001 to 2 wt %, or 0.01 to 1 wt. % in the functionalized pores as described herein, thereby reducing the usage of expensive rare earth metals. In an embodiment, the cathode current collector and the method of functionalizing with gold is essentially free of gold in its acetate form, such as completely free or less than 5% by weight or less than 1% by weight of gold acetate. In an embodiment, the cathode current collector is essentially free of sulfur or Li—S molecules, such as completely free or less than 5% by weight or less than 1% by weight of Li—S.

In an embodiment, the cathode current collector is a freestanding monolith not formed as a ground powder or mixed with a binder. Thus, it is exclusive of or essentially free of a binder, such as completely free or less than 1% by weight of the current collector.

In summary, the cathode current collector porous material described herein allows for pore size to be more carefully controlled for efficient battery kinetics and the cathode current collector to be more mechanically robust. Furthermore, in the cathode current collector described herein the nanoparticle catalysts can be placed at the reaction sites of interest within the pores.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

It is claimed:

1. An air-cathode battery comprising:
   a porous cathode current collector with an air interface;
   an ionic liquid electrolyte disposed in pores of the porous cathode current collector;
   a metal anode; and
   a separator in contact with the ionic liquid electrolyte and coupled between the porous cathode current collector and the metal anode;
   wherein the porous cathode current collector is an ionogel comprised of a silica sol-gel and the pores are functionalized with a thiol group-containing species that is functionalized with one or more catalytic nanoparticles.

2. The air-cathode battery of claim 1, wherein the thiol group containing species is a mercaptosilane.

3. The air cathode battery of claim 1, wherein the porous cathode current collector comprises conductive carbon particles.

4. The air cathode battery of claim 1, wherein the pores have a diameter of 10 nm to 10 μm.

5. The air cathode battery of claim 1, wherein the ionic liquid is thermally stable up to 350° C. and has a viscosity at 25° C. of 10 cP to 200 cP.

6. The air cathode battery of claim 1, wherein the metal of the metal anode comprises lithium.

7. The air cathode battery of claim 1, wherein the pore diameters have a polydispersity of 1.5 or less.

8. The air cathode battery of claim 1, wherein the pores are functionalized with gold nanoparticles and the gold nanoparticles have an average particle diameter of 5 nm to 150 nm.

9. A method of making an air cathode battery comprising:
a porous cathode current collector made by the steps comprising:
synthesizing a silica sol-gel porous material;
optionally drying the silica sol-gel to form a silica aerogel;
adding an ionic liquid electrolyte;
optionally adding carbon nanoparticles or a pre-formed carbon mat to make the porous material conductive;
functionalizing pores of the porous material with a thiol group containing species, then functionalizing the thiol group containing species with catalytic nanoparticles, or electroplating the pores with a catalytic metal; and
assembling the porous cathode current collector into the air cathode battery.

10. The method of claim 9, wherein adding the ionic liquid electrolyte is performed prior to or during synthesizing of the silica sol-gel, and the ionic liquid electrolyte acts as a solvent for the synthesizing.

11. The method of claim 9, wherein adding the ionic liquid electrolyte is performed after synthesizing of the silica sol-gel, and a solvent used in the synthesizing step is removed.

12. The method of claim 9, wherein gold nanoparticles are added to the porous material in in a weight percent based on the weight of the porous material in an amount of 0.001 to 5%.

13. The method of claim 9, wherein carbon nanoparticles are added during the synthesizing of the silica sol-gel.

14. An air-cathode battery comprising:
a porous cathode current collector with an air interface;
an ionic liquid electrolyte disposed in pores of the porous cathode current collector;
a metal anode; and
a separator in contact with the ionic liquid electrolyte and coupled between the porous cathode current collector and the metal anode;
wherein the porous cathode current collector is an ionogel comprised of a silica sol-gel and the pores are electroplated with catalytic metal.

15. The air cathode battery of claim 14, wherein the pores are electroplated with gold and a layer of electroplated gold is 1 nm to 50 nm in thickness.

16. The air cathode battery of claim 14, wherein the ionic liquid electrolyte comprises an imidazolium cation.

17. The air cathode battery of claim 14, wherein the pore diameters have a polydispersity of 1.1 or less.

18. The air cathode battery of claim 14, wherein the porous cathode current collector comprises conductive carbon particles in an amount sufficient to meet a percolation threshold at which a complete electrical network is formed throughout the cathode current collector.

19. The air cathode battery of claim 18, wherein the catalytic nanoparticles are present in the porous material in a weight percent based on the weight of the porous material in an amount of 0.001 to 5%.

* * * * *